United States Patent
Suyama et al.

(10) Patent No.: US 10,998,547 B2
(45) Date of Patent: May 4, 2021

(54) NEGATIVE ELECTRODE CURRENT COLLECTOR, NEGATIVE ELECTRODE, AND AQUEOUS LITHIUM ION SECONDARY BATTERY

(71) Applicant: TOYOTA JIDOSHA KABUSHIKI KAISHA, Toyota (JP)

(72) Inventors: Hiroshi Suyama, Mishima (JP); Hideki Nakayama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 16/021,812

(22) Filed: Jun. 28, 2018

(65) Prior Publication Data

US 2019/0027745 A1    Jan. 24, 2019

(30) Foreign Application Priority Data

Jul. 18, 2017  (JP) .............................. JP2017-139353

(51) Int. Cl.
*H01M 4/40* (2006.01)
*H01M 4/50* (2010.01)
(Continued)

(52) U.S. Cl.
CPC ........... *H01M 4/405* (2013.01); *H01M 4/485* (2013.01); *H01M 4/50* (2013.01); *H01M 4/505* (2013.01); *H01M 4/60* (2013.01); *H01M 4/661* (2013.01); *H01M 4/667* (2013.01); *H01M 10/36* (2013.01); *H01M 10/38* (2013.01); *H01M 2004/027* (2013.01); *H01M 2004/028* (2013.01);
(Continued)

(58) Field of Classification Search
CPC ........ H01M 4/485; H01M 4/50; H01M 4/505; H01M 4/60; H01M 4/661; H01M 4/667; H01M 10/36; H01M 10/38; H01M 2300/0002
See application file for complete search history.

(56) References Cited

U.S. PATENT DOCUMENTS

2013/0020999 A1*  1/2013  Whitacre ............... H01M 14/00
                                                        320/118
2014/0131633 A1    5/2014  Ito et al.
(Continued)

FOREIGN PATENT DOCUMENTS

CN       105826520 A    8/2016
EP       3 220 459 A1    9/2017
(Continued)

OTHER PUBLICATIONS

Yuki Yamada et al.: "Hydrate-melt electrolytes for high-energy-density aqueous batteries", nature energy, No. 16129, pp. 1-9, Aug. 26, 2016.
(Continued)

*Primary Examiner* — Brittany L Raymond
(74) *Attorney, Agent, or Firm* — Sughrue Mion, PLLC (57) ABSTRACT

There is provided a negative electrode current collector that is used in contact with an aqueous electrolyte solution in an aqueous lithium ion secondary battery, including a surface in contact with the aqueous electrolyte solution, the surface including a material containing at least one selected from the group consisting of Ti, Pb, Zn, Sn, Mg, Zr and In as a main component.

8 Claims, 9 Drawing Sheets

(51) Int. Cl.
*H01M 4/60* (2006.01)
*H01M 10/38* (2006.01)
*H01M 4/66* (2006.01)
*H01M 10/36* (2010.01)
*H01M 4/485* (2010.01)
*H01M 4/505* (2010.01)
*H01M 4/02* (2006.01)

(52) U.S. Cl.
CPC ............... *H01M 2300/002* (2013.01); *H01M 2300/0014* (2013.01)

(56) References Cited

U.S. PATENT DOCUMENTS

| | | |
|---|---|---|
| 2015/0311516 A1 | 10/2015 | Chen et al. |
| 2015/0318530 A1 | 11/2015 | Yushin et al. |
| 2017/0373351 A1 | 12/2017 | Kawai et al. |
| 2018/0269537 A1* | 9/2018 | Yoshima ............ H01M 10/4257 |

FOREIGN PATENT DOCUMENTS

| | | |
|---|---|---|
| IN | 201714008506 | 10/2017 |
| JP | 11-242954 A | 9/1999 |
| JP | 2004-362837 | * 12/2004 |
| JP | 2004-362837 A | 12/2004 |
| JP | 2010108676 A | 5/2010 |
| JP | 2014-515546 A | 6/2014 |
| JP | 2017-27944 A | 2/2017 |
| RU | 2556239 C1 | 7/2015 |
| WO | 2016/114141 A1 | 7/2016 |

OTHER PUBLICATIONS

Kosuke Nakamoto eta al.: "Effect of Concentrated Electrolyte on Aqueous Sodium-ion Battery with Sodium Manganese Hexacyanoferrate Cathode", Electrochemistry, vol. 85, pp. 179-185, Apr. 5, 2017.
"The basics of Electrochemistry" pp. 54, 124-126 (chapter 8.1. Non-consumable electrodes), MOCKBA,1988 (4 pages total).
Partial Translation of Communication dated Feb. 25, 2019, from the Russian Patent and Trademark Office in counterpart application No. 2018123341/07.

* cited by examiner

NEGATIVE ELECTRODE CURRENT COLLECTOR, NEGATIVE ELECTRODE, AND AQUEOUS LITHIUM ION SECONDARY BATTERY

INCORPORATION BY REFERENCE

The disclosure of Japanese Patent Application No. 2017-139353 filed on Jul. 18, 2017 including the specification, drawings and abstract is incorporated herein by reference in its entirety.

BACKGROUND

1. Technical Field

The present disclosure discloses a negative electrode current collector used for an aqueous lithium ion secondary battery and the like.

2. Description of Related Art

A lithium ion secondary battery including a flammable non-aqueous electrolyte solution has a problem that an energy density per volume for the entire battery is decreased as a result of the number of safety measuring components having to be increased. On the other hand, in a lithium ion secondary battery including a nonflammable aqueous electrolyte solution, since the above safety measures are unnecessary, an energy density per volume is increased. However, an aqueous electrolyte solution of the related art has a problem that a potential window is narrow and there are restrictions on available active materials and the like.

As one solution for addressing the above problems that the aqueous electrolyte solution has, in Yuki Yamada et al., "Hydrate-melt electrolytes for high-energy-density aqueous batteries," NATURE ENERGY (26 Aug. 2016), a high concentration aqueous electrolyte solution called a hydrate-melt obtained by mixing two specific types of lithium salt and water in a predetermined ratio is disclosed. In Yuki Yamada et al., "Hydrate-melt electrolytes for high-energy-density aqueous batteries," NATURE ENERGY (26 Aug. 2016), when such a high concentration aqueous electrolyte solution is used, $Li_4Ti_5O_{12}$ (hereinafter referred to as "LTO" in some cases), which has been difficult to use for a negative electrode active material in an aqueous lithium ion battery of the related art, is used for a negative electrode active material, and charging and discharging of the aqueous lithium ion secondary battery have been confirmed.

SUMMARY

Electrolysis of a general aqueous electrolyte solution generally proceeds at a potential above a charging and discharging potential of LTO. According to findings by the inventors, in a high concentration aqueous electrolyte solution disclosed in Yuki Yamada et al., "Hydrate-melt electrolytes for high-energy-density aqueous batteries", NATURE ENERGY (26 Aug. 2016), although a potential window is expanded due to addition of LiTFSI, electrolysis may proceed at a potential above a charging and discharging potential of LTO in some cases. When an aqueous electrolyte solution undergoes electrochemical reductive decomposition at a potential above a charging and discharging potential of LTO, current is consumed in the reaction, a charging reaction of LTO does not proceed, and a discharging reaction of a battery is not observed. Nevertheless, in Yuki Yamada et al., "Hydrate-melt electrolytes for high-energy-density aqueous batteries," NATURE ENERGY (26 Aug. 2016), charging and discharging of an aqueous lithium ion secondary battery including LTO as a negative electrode active material can be realized.

An oxidative and reductive decomposition potential of an aqueous electrolyte solution varies according to not only a composition of an aqueous electrolyte solution but also an overvoltage generated in a current collector. A magnitude of the overvoltage depends on a material of a current collector (conductivity of a current collector). For example, when stainless steel is used for a negative electrode current collector, decomposition of an electrolyte solution easily occurs due to an overvoltage. Even if a high concentration aqueous electrolyte solution is used as an electrolyte solution, charging and discharging of an aqueous lithium ion secondary battery including LTO as a negative electrode active material are difficult. In this regard, in Yuki Yamada et al., "Hydrate-melt electrolytes for high-energy-density aqueous batteries", NATURE ENERGY (26 Aug. 2016), it is thought that, when not only a high concentration aqueous electrolyte solution is used as an electrolyte solution, but also Al is used for a negative electrode current collector, decomposition of an electrolyte solution due to an overvoltage can be reduced, a reduction side potential window of the aqueous electrolyte solution can be expanded, and charging and discharging of an aqueous lithium ion secondary battery including LTO as a negative electrode active material can be confirmed.

However, when the inventors conducted extensive studies, it was found that, if Al is used for a negative electrode current collector in an aqueous lithium ion secondary battery, there is a new problem of the cycle stability of a secondary battery deteriorating. Specifically, the inventors confirmed that, when Al is used for a negative electrode current collector in the aqueous lithium ion secondary battery, charging and discharging in the first cycle for a secondary battery is possible, but in the second and subsequent cycles, charging and discharging are not stabilized in some cases, with for example, a decomposition current of an electrolyte solution being generated.

The inventors think that, when Al is used for a negative electrode current collector in an aqueous lithium ion secondary battery, the cycle stability of the secondary battery deteriorates due to the activity of an Al current collector surface easily changing during charging and discharging of the secondary battery such as in reductive alteration and removal of a passive state film (oxide film) on an Al current collector surface according to charging and discharging of the secondary battery. Based on this thinking, the inventors examined various materials other than Al for a negative electrode current collector that is applied to an aqueous lithium ion secondary battery. As a result, the following findings were obtained. (1) When a material with a work function of a certain level or less is used to form a surface of a negative electrode current collector, a reduction side potential window of an aqueous electrolyte solution in the secondary battery can be expanded. (2) When a surface of the negative electrode current collector is formed of a specific material among materials with a work function of a certain level or less, cycle stability of the secondary battery can be ensured.

Based on the above findings, a first aspect of the present disclosure is a negative electrode current collector that is used in contact with an aqueous electrolyte solution in an aqueous lithium ion secondary battery, including a surface in contact with the aqueous electrolyte solution, the surface including a material containing at least one selected from the group consisting of Ti, Pb, Zn, Sn, Mg, Zr and In as a main component.

A "surface in contact with an aqueous electrolyte solution" refers to a surface that is in contact with the aqueous electrolyte solution among surfaces of the negative electrode current collector when actually applied to an aqueous lithium ion secondary battery. In the negative electrode current collector of the present disclosure, only a surface that is in contact with the aqueous electrolyte solution may be made of the above specific material, all surfaces (the whole surface) may be made of the above specific material, or the entire surface and interior may be made of the above specific material. "Ti, Pb, Zn, Sn, Mg, Zr and In" may have surfaces which are inevitably in a passive state due to natural oxidation or the like. That is, "Ti, Pb, Zn, Sn, Mg, Zr and In" include a form containing inevitable impurities such as an oxide film. According to findings by the inventors, unlike Al, components related to the above group are electrochemically relatively stable in the passive state, and a change in activity during charging and discharging is smaller than that of Al. That is, even if Ti and the like are in a passive state, cycle stability can be ensured. The "main component" refers to a component whose proportion is 50 mol % or more with respect to the entire material. When two or more components selected from among the above group are contained in the material, a total amount of the two or more components may be 50 mol % or more. In the negative electrode current collector of the present disclosure, when elemental analysis is performed on a surface of the negative electrode current collector by EDX or the like, in any unit surface ($mm^2$), a component related to the above group is the main component. That is, when the surface of the negative electrode current collector is divided into unit areas ($mm^2$), in any division, a component related to the above group is the main component.

In the negative electrode current collector of the first aspect, the surface may include the material containing Ti as a main component.

A second aspect of the present disclosure is a negative electrode that is used in contact with an aqueous electrolyte solution in an aqueous lithium ion secondary battery, including a negative electrode current collector and a negative electrode active material layer that includes a negative electrode active material and is in contact with the negative electrode current collector, wherein the negative electrode current collector is the negative electrode current collector of the first aspect.

In the negative electrode of the second aspect, the negative electrode active material may contain lithium titanate.

A third aspect of the present disclosure is an aqueous lithium ion secondary battery that includes a negative electrode current collector, a negative electrode active material layer that includes a negative electrode active material and is in contact with the negative electrode current collector, a positive electrode current collector, a positive electrode active material layer that includes a positive electrode active material and is in contact with the positive electrode current collector, and an aqueous electrolyte solution containing water and an electrolyte, wherein the negative electrode current collector is in contact with the aqueous electrolyte solution and the negative electrode current collector is the negative electrode current collector of the first aspect.

In the aqueous lithium ion secondary battery of the third aspect, the negative electrode active material may contain lithium titanate.

In the aqueous lithium ion secondary battery of the third aspect, a pH of the aqueous electrolyte solution may be within a range of 3 to 11.

In the aqueous lithium ion secondary battery of the third aspect, the electrolyte may contain lithium bis(trifluoromethanesulfonyl)imide and the aqueous electrolyte solution may contain the lithium bis(trifluoromethanesulfonyl)imide such that an amount of substance of the lithium bis(trifluoromethanesulfonyl)imide is within a range of 7.5 mol or more and 12.5 mol or less per kg of water.

In the aqueous lithium ion secondary battery of the third aspect, the positive electrode active material may contain Li.

In the aqueous lithium ion secondary battery of the third aspect, the positive electrode active material may further contain Ni and Mn in addition to the elemental Li.

When the negative electrode current collector of the present disclosure is applied to an aqueous lithium ion secondary battery, it is possible to expand the reduction side potential window of the aqueous electrolyte solution and it is possible to ensure cycle stability of the secondary battery.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

1. Negative Electrode Current Collector

Figure 1A:
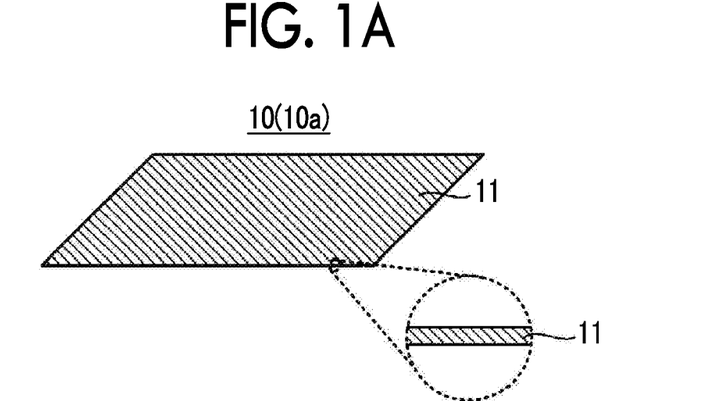
FIG. 1A is a schematic diagram for explaining an example of a configuration of a negative electrode current collector.
Figure 1B:
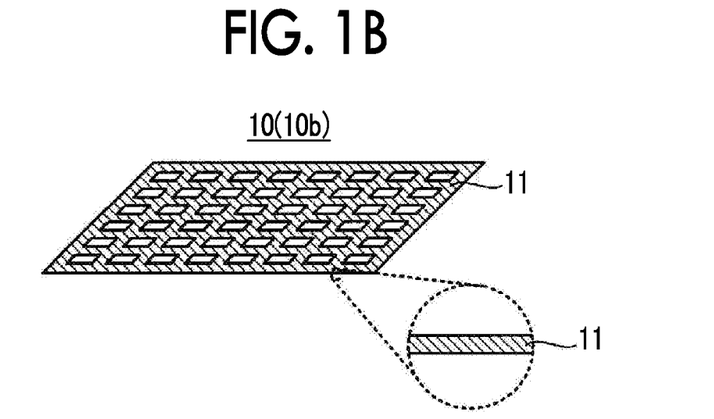
FIG. 1B is a schematic diagram for explaining an example of a configuration of a negative electrode current collector.
Figure 1C:
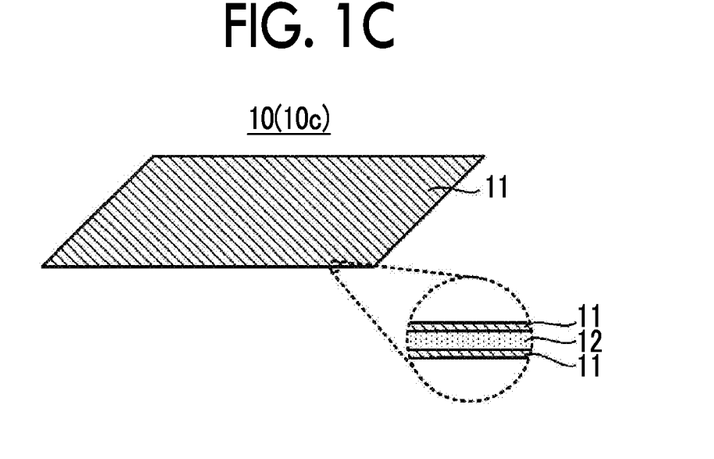
FIG. 1C is a schematic diagram for explaining an example of a configuration of a negative electrode current collector.

FIG. 1A to FIG. 1C show examples of a configuration of a negative electrode current collector. A negative electrode current collector 10 shown in FIG. 1A to FIG. 1C is used in contact with an aqueous electrolyte solution in an aqueous lithium ion secondary battery. Among surfaces of the negative electrode current collector 10, a surface that is brought into contact with the aqueous electrolyte solution is made of a material 11 containing at least one selected from the group consisting of Ti, Pb, Zn, Sn, Mg, Zr and In as a main component.

According to new findings by the inventors, when a material with a work function of 4.5 eV or less is used to form a surface (particularly, a surface that is brought into contact with the electrolyte solution) of the negative electrode current collector 10, it is possible to increase an overvoltage for reductive decomposition of water and greatly expand a reduction side potential window of the aqueous electrolyte solution. Specifically, the reduction side potential window can expand to a potential that is lower than an aqueous solution withstand voltage considered in the Nernst law and the potential window can expand to 1.83 V vs. Li/Li$^+$ which is a thermodynamically stable range of water or less. Here, all of Ti, Pb, Zn, Sn, Mg, Zr and In described above have a work function of 4.5 eV or less. That is, when the material 11 containing a component with a work function of 4.5 eV or less as a main component is used to form a surface of the negative electrode current collector 10, a reduction side potential window of the aqueous electrolyte solution can expand to a thermodynamically stable range.

On the other hand, according to the new findings by the inventors, when the material 11 is used to form a surface of the negative electrode current collector 10, cycle stability of a secondary battery can be ensured unlike a case in which Al is used to form a surface of the negative electrode current collector 10. Unlike Al, regarding Ti and the like that may constitute the material 11, a passive state thereof is electrochemically relatively stable, and change in activity on a surface of Ti and the like during charging and discharging is thought to be smaller than that of Al, which is thought to be connected to cycle stability.

The material 11 contains at least one selected from the group consisting of Ti, Pb, Zn, Sn, Mg, Zr and In as a main component. That is, the material 11 contains at least one selected from the group consisting of Ti, Pb, Zn, Sn, Mg, Zr and In at 50 mol % or more, preferably 70 mol % or more, more preferably 80 mol % or more, and still more preferably 90 mol % or more. Most preferably, the material 11 contains at least one selected from the group consisting of Ti, Pb, Zn, Sn, Mg, Zr and In. Here, in a range in which the above problem can be solved, the material 11 may include components other than Ti, Pb, Zn, Sn, Mg, Zr and In.

A surface of the negative electrode current collector 10 that is brought into contact with the aqueous electrolyte solution may be formed of the material 11 and its form (shape) varies as shown in FIG. 1A to FIG. 1C. For example, as shown in FIG. 1A, a foil-like or a sheet-like negative electrode current collector 10a made of the above material 11 may be used. As shown in FIG. 1B, a mesh-like or punched metal-like negative electrode current collector 10b made of the above material 11 may be used. The negative electrode current collectors 10a and 10b can be easily produced by molding, for example, the above material 11. Alternatively, as shown in FIG. 1C, a negative electrode current collector 10c obtained by applying the above material 11 to a surface of a substrate 12 made of a material different from the above material 11 may be used. That is, the surface and the inside of the negative electrode current collector 10 may be formed of different materials. The negative electrode current collector 10c can be easily produced by applying the above material 11 thinly to a surface of the substrate 12, by for example, plating or sputtering. The substrate 12 may be one that can ensure mechanical strength and durability for the negative electrode current collector 10c. For example, the substrate 12 may be made of a metal other than the above material 11, or the substrate 12 may be made of a material (such as a resin) other than a metal. In this manner, in the negative electrode current collector 10c, the material 11 can be reduced, which is advantageous for costs.

According to new findings by the inventors, when a surface of the negative electrode current collector 10 is formed of Ti, Sn, Zn or Mg among the above components, cycle stability is further improved. In particular, when a surface of the negative electrode current collector 10 is formed of Ti, a reduction side potential window of the aqueous electrolyte solution expands more after the charging and discharging cycle than before the charging and discharging cycle of the secondary battery. That is, even if the charging and discharging cycle of the secondary battery is repeated, the negative electrode current collector does not deteriorate, rather characteristics are improved, which greatly contributes to cycle stability of the negative electrode. This effect is a unique effect that is observed only in the case of Ti. In addition, compared to a case in which a component other than Ti is used, in a case in which Ti is used, a peak current value of an oxidation current (discharging) observed in CV is higher, which is thought to be advantageous in rate characteristics. In this regard, among surfaces of the negative electrode current collector 10, a surface that is brought into contact with the aqueous electrolyte solution is preferably formed of a material containing at least one selected from the group consisting of Ti, Sn, Zn and Mg as a main component, and particularly preferably formed of a material containing Ti as a main component.

On the other hand, according to new findings by the inventors, among surfaces of the negative electrode current collector 10, when a surface that is brought into contact with the aqueous electrolyte solution is made of a material with a smaller work function, a reduction side potential window of the aqueous electrolyte solution can further expand. In this regard, the material 11 preferably contains at least one selected from the group consisting of Ti, Pb, Zn, Mg, Zr and In as a main component among the above components and more preferably contains at least one selected from the group consisting of Pb, Mg, Zr and In as a main component.

On the other hand, in consideration of environmental toxicity, the material 11 preferably contains at least one selected from the group consisting of Ti, Zn, Sn, Mg, Zr and In as a main component.

2. Negative Electrode

Figure 2:
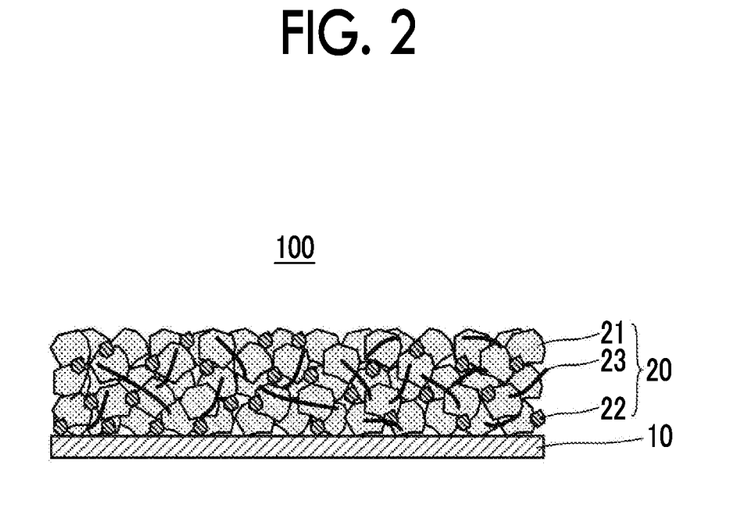
FIG. 2 is a schematic diagram for explaining an example of a configuration of a negative electrode.

FIG. 2 shows an example of a configuration of a negative electrode current collector. A negative electrode 100 shown in FIG. 2 is used in contact with the aqueous electrolyte solution in the aqueous lithium ion secondary battery. The negative electrode 100 includes the negative electrode current collector 10 and a negative electrode active material layer 20 that includes a negative electrode active material 21 and is in contact with the negative electrode current collector 10. In this manner, the negative electrode 100 has a feature in which the negative electrode current collector 10 having a surface that is brought into contact with the aqueous electrolyte solution and is made of a predetermined material is used.

2.1. Negative Electrode Current Collector

The negative electrode current collector 10 is the same as described above. Descriptions thereof are omitted here.

2.2. Negative Electrode Active Material Layer

The negative electrode active material layer 20 is in contact with the negative electrode current collector 10. For example, when a slurry containing the negative electrode active material 21 and the like is applied to a surface of the negative electrode current collector 10 and dried, the negative electrode active material layer 20 is laminated on the surface of the negative electrode current collector 10. Alternatively, when the negative electrode active material 21 and the like are dried and molded together with the negative electrode current collector 10, the negative electrode active material layer 20 can be laminated on the surface of the negative electrode current collector 10.

2.2.1. Negative Electrode Active Material

The negative electrode active material layer 20 includes the negative electrode active material 21. The negative electrode active material 21 may be selected in consideration of a potential window of the aqueous electrolyte solution. For example, a lithium-transition metal complex oxide; a metal sulfide such as $Mo_6S_8$; elemental sulfur; $LiTi_2(PO_4)_3$; and NASICON may be exemplified. In particular, a lithium-transition metal complex oxide is preferably included and a lithium titanate is more preferably included. Among them, $Li_4Ti_5O_{12}$ (LTO) is particularly preferably included because a favorable solid electrolyte interphase (SEI) is then easily formed. In this manner, according to the negative electrode 100, charging and discharging of LTO in an aqueous solution which was thought not to be possible in the related art can be stably performed.

The form of the negative electrode active material 21 is not particularly limited. For example, a particle form is preferable. When the negative electrode active material 21 has a particle form, a primary particle size thereof is preferably 1 nm or more and 100 μm or less. A lower limit is more preferably 10 nm or more, still more preferably 50 nm or more, and most preferably 100 nm or more. An upper limit is more preferably 30 μm or less and most preferably 10 μm or less. Incidentally, in the negative electrode active material 21, primary particles may aggregate to form secondary particles. In this case, a particle size of the secondary particles is not particularly limited, and is generally 0.5 μm or more and 100 μm or less. A lower limit is preferably 1 μm or more and an upper limit is preferably 20 μm or less. When the particle size of the negative electrode active material 21 is within such a range, it is possible to obtain a negative electrode active material layer 20 with better ionic conductivity and electron conductivity.

An amount of the negative electrode active material 21 contained in the negative electrode active material layer 20 is not particularly limited. For example, when the total content of the negative electrode active material layer 20 is set as a reference (100 mass %), the negative electrode active material 21 is preferably contained at 10 mass % or more, more preferably 20 mass % or more, and most preferably 40 mass % or more. An upper limit is not particularly limited, and is preferably 99 mass % or less, more preferably 95 mass % or less, and most preferably 90 mass % or less. When the content of the negative electrode active material 21 is within such a range, it is possible to obtain the negative electrode active material layer 20 with better ionic conductivity and electron conductivity.

2.2.2. Optional Components

The negative electrode active material layer 20 preferably contains a conductive assistant 22 and a binder 23 in addition to the negative electrode active material 21.

Any conductive assistant used for aqueous lithium ion secondary batteries can be used as the conductive assistant 22. Specifically, a conductive assistant containing a carbon material selected from among Ketchen black (KB), vapor grown carbon fibers (VGCF), acetylene black (AB), carbon nanotubes (CNT), and carbon nanofibers (CNF) is preferable. Alternatively, a metal material that can withstand an environment in which the battery is used may be used. As the conductive assistant 22, only one type may be used alone or two or more types may be used in a mixture. As the form of the conductive assistant 22, various forms such as a powder form and a fiber form can be used. An amount of the conductive assistant 22 contained in the negative electrode active material layer 20 is not particularly limited. For example, when the total content of the negative electrode active material layer 20 is set as a reference (100 mass %), the conductive assistant 22 is preferably contained at 10 mass % or more, more preferably 30 mass % or more, and most preferably 50 mass % or more. An upper limit is not particularly limited, and is preferably 90 mass % or less, more preferably 70 mass % or less, and most preferably 50 mass % or less. When the content of the conductive assistant 22 is within such a range, it is possible to obtain the negative electrode active material layer 20 with better ionic conductivity and electron conductivity.

Any binder used for aqueous lithium ion secondary batteries can be used as the binder 23. For example, styrene butadiene rubber (SBR), carboxymethyl cellulose (CMC), acrylonitrile butadiene rubber (ABR), butadiene rubber (BR), polyvinylidene fluoride (PVDF), and polytetrafluoroethylene (PTFE) may be exemplified. As the binder 23, only one type may be used alone or two or more types may be used in a mixture. An amount of the binder 23 contained in the negative electrode active material layer 20 is not particularly limited. For example, when the total content of the negative electrode active material layer 20 is set as a reference (100 mass %), the binder 23 is preferably contained at 1 mass % or more, more preferably 3 mass % or more, and most preferably 5 mass % or more. An upper limit is not particularly limited, and is preferably 90 mass % or less, more preferably 70 mass % or less, and most preferably 50 mass % or less. When the content of the binder 23 is within such a range, the negative electrode active material 21 and the like can be appropriately bonded and it is possible to obtain the negative electrode active material layer 20 with better ionic conductivity and electron conductivity.

The thickness of the negative electrode active material layer 20 is not particularly limited, and is, for example, preferably 0.1 μm or more and 1 mm or less and more preferably 1 μm or more and 100 μm or less.

3. Aqueous Lithium Ion Secondary Battery

Figure 3:
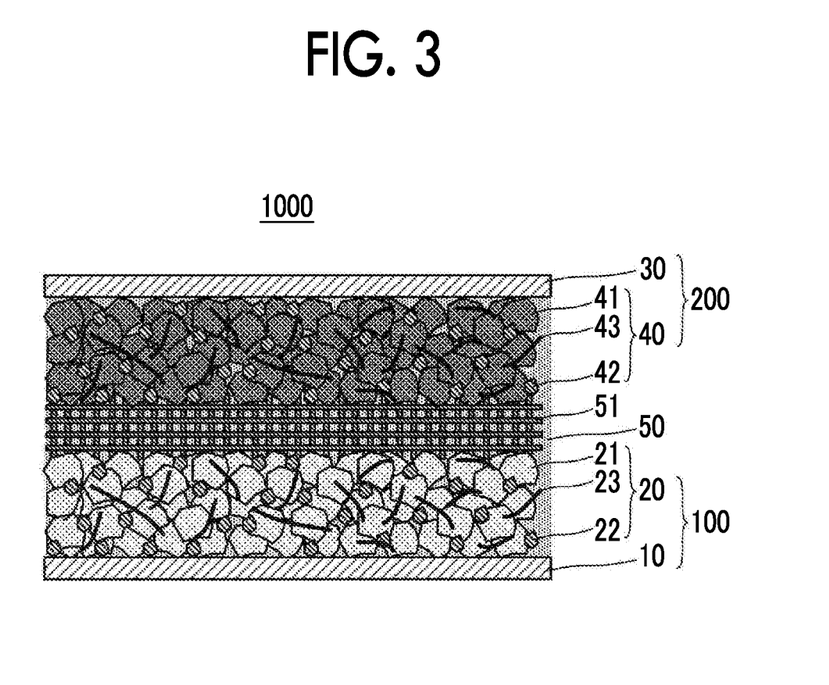
FIG. 3 is a schematic diagram for explaining an example of a configuration of an aqueous lithium ion secondary battery.

FIG. 3 shows an example of a configuration of an aqueous lithium ion secondary battery. An aqueous lithium ion secondary battery 1000 shown in FIG. 3 includes the negative electrode current collector 10, the negative electrode active material layer 20 that includes the negative electrode active material 21 and is in contact with the negative electrode current collector 10, a positive electrode current collector 30, a positive electrode active material layer 40 that includes a positive electrode active material 41 and is in contact with the positive electrode current collector 30, and an aqueous electrolyte solution 50 that contains water and an electrolyte. In the battery 1000, the negative electrode current collector 10 is in contact with the aqueous electrolyte solution 50. In this manner, the battery 1000 has a feature in which the negative electrode current collector 10 having a surface that is brought into contact with the aqueous electrolyte solution and is made of a predetermined material is used.

3.1. Negative Electrode Current Collector and Negative Electrode Active Material Layer The negative electrode current collector 10 and the negative electrode active material layer 20 are the same as those described above. Descriptions thereof are omitted here.

3.2. Positive Electrode Current Collector

For the positive electrode current collector 30, a known metal available for a positive electrode current collector of an aqueous lithium ion secondary battery can be used. As such a metal, a metal material containing at least one element selected from the group consisting of Cu, Ni, Al, V, Au, Pt, Mg, Fe, Ti, Co, Cr, Zn, Ge, and In can be exemplified. The form of the positive electrode current collector 30 is not particularly limited. Various forms such as a foil form and a mesh form can be used.

3.3. Positive Electrode Active Material Layer

The positive electrode active material layer 40 contains the positive electrode active material 41. In addition, the positive electrode active material layer 40 may contain a conductive assistant 42 and a binder 43 other than the positive electrode active material 41.

3.3.1. Positive Electrode Active Material

Any positive electrode active material used for aqueous lithium ion secondary batteries can be used as the positive electrode active material 41. Needless to say, the positive electrode active material 41 has a higher potential than the negative electrode active material 21, and is appropriately selected in consideration of a potential window of the aqueous electrolyte solution 50 to be described below. For example, a material containing the elemental Li is preferable. Specifically, oxides containing the elemental Li and polyanions are preferable. More specifically, lithium cobalt oxide ($LiCoO_2$); lithium nickel oxide ($LiNiO_2$); lithium manganese oxide ($LiMn_2O_4$); $LiNi_{1/3}Mn_{1/3}Co_{1/3}O_2$; heterogeneous element-substituted Li—Mn spinel represented by $Li_{1+x}Mn_{2-x-y}M_yO_4$ (M is at least one selected from among Al, Mg, Co, Fe, Ni, and Zn); lithium titanate ($Li_xTiO_y$) having a charging and discharging potential above the above negative electrode active material; lithium metal phosphate ($LiMPO_4$, M is at least one selected from among Fe, Mn, Co, and Ni); and the like may be exemplified. In particular, a positive electrode active material containing the elemental Mn in addition to the elemental Li is preferable and a positive electrode active material having a spinel structure such as $LiMn_2O_4$ and $Li_{1+x}Mn_{2-x-y}Ni_yO_4$ is more preferable. With the aqueous electrolyte solution 50 to be described below, a high-potential positive electrode active material containing the elemental Mn in addition to the elemental Li is preferably used, since then an oxidation potential of the potential window can be about 5.0 V (vs. $Li/Li^+$) or more. As the positive electrode active material 41, only one type may be used alone or two or more types may be used in a mixture.

The form of the positive electrode active material 41 is not particularly limited. For example, a particle form is preferable. When the positive electrode active material 41 has a particle form, a primary particle size thereof is preferably 1 nm or more and 100 μm or less. A lower limit is more preferably 5 nm or more, still more preferably 10 nm or more, and most preferably 50 nm or more. An upper limit is more preferably 30 μm or less and most preferably 10 μm or less. Incidentally, in the positive electrode active material 41, primary particles may aggregate to form secondary particles. In this case, a particle size of the secondary particles is not particularly limited, and is generally 0.5 μm or more and 50 μm or less. A lower limit is preferably 1 μm or more and an upper limit is preferably 20 μm or less. When the particle size of the positive electrode active material 41 is within such a range, it is possible to obtain the positive electrode active material layer 40 with better ionic conductivity and electron conductivity.

An amount of the positive electrode active material 41 contained in the positive electrode active material layer 40 is not particularly limited. For example, when the total content of the positive electrode active material layer 40 is set as a reference (100 mass %), the positive electrode active material 41 is preferably contained at 10 mass % or more, more preferably 20 mass % or more, and most preferably 40 mass % or more. An upper limit is not particularly limited, and is preferably 99 mass % or less, more preferably 97 mass % or less, and most preferably 95 mass % or less. When the content of the positive electrode active material 41 is within such a range, it is possible to obtain the positive electrode active material layer 40 with better ionic conductivity and electron conductivity.

3.3.2. Optional Components

The positive electrode active material layer 40 preferably contains the conductive assistant 42 and the binder 43 in addition to the positive electrode active material 41. The type of the conductive assistant 42 and the binder 43 is not particularly limited. For example, those exemplified as the conductive assistant 22 and the binder 23 above can be appropriately selected and used. An amount of the conductive assistant 42 contained in the positive electrode active material layer 40 is not particularly limited. For example, when the total content of the positive electrode active material layer 40 is set as a reference (100 mass %), the conductive assistant 42 is preferably contained at 0.1 mass % or more, more preferably 0.5 mass % or more, and most preferably 1 mass % or more. An upper limit is not particularly limited, and is preferably 50 mass % or less, more preferably 30 mass % or less, and most preferably 10 mass % or less. In addition, an amount of the binder 43 contained in the positive electrode active material layer 40 is not particularly limited. For example, when the total content of the positive electrode active material layer 40 is set as a reference (100 mass %), the binder 43 is preferably contained at 0.1 mass % or more, more preferably 0.5 mass % or more, and most preferably 1 mass % or more. An upper limit is not particularly limited, and is preferably 50 mass % or less, more preferably 30 mass % or less, and most preferably 10 mass % or less. When the content of the conductive assistant 42 and the binder 43 is within such a range, it is possible to obtain the positive electrode active material layer 40 with better ionic conductivity and electron conductivity.

The thickness of the positive electrode active material layer 40 is not particularly limited, and is, for example, preferably 0.1 µm or more and 1 mm or less and more preferably 1 µm or more and 100 µm or less.

3.4. Aqueous Electrolyte Solution

In the lithium ion secondary battery based on an electrolyte solution, the electrolyte solution is present inside the negative electrode active material layer, inside the positive electrode active material layer, and in a gap between the negative electrode active material layer and the positive electrode active material layer. Accordingly, the lithium ion conductivity between the negative electrode active material layer and the positive electrode active material layer is ensured. This form is also used in the battery 1000. Specifically, in the battery 1000, a separator 51 is provided between the negative electrode active material layer 20 and the positive electrode active material layer 40, and the separator 51, the negative electrode active material layer 20, and the positive electrode active material layer 40 are immersed together in the aqueous electrolyte solution 50. The aqueous electrolyte solution 50 penetrates into the negative electrode active material layer 20 and the positive electrode active material layer 40, and is in contact with the negative electrode current collector 10 and the positive electrode current collector 30.

3.4.1. Solvent

The solvent contains water as a main component. That is, when the total amount of the solvent (liquid component) constituting the electrolyte solution is set as a reference (100 mol %), water is contained at 50 mol % or more, preferably 70 mol % or more, and more preferably 90 mol % or more. On the other hand, an upper limit of a proportion of water in the solvent is not particularly limited.

Although the solvent contains water as a main component, a solvent other than water may also be contained, for example, in order to form an SEI on the surface of the active material. As the solvent other than water, for example, at least one selected from among ethers, carbonates, nitriles, alcohols, ketones, amines, amides, sulfur compounds and hydrocarbons may be used. When the total amount of the solvent (liquid component) constituting the electrolyte solution is set as a reference (100 mol %), solvents other than water are preferably contained at 50 mol % or less, more preferably 30 mol % or less, and most preferably 10 mol % or less.

3.4.2. Electrolyte

The aqueous electrolyte solution 50 contains an electrolyte. The electrolytes for the aqueous electrolyte solution may be known. For example, preferably, the electrolyte contains lithium bis(trifluoromethanesulfonyl)imide (LiTFSI). More preferably, the electrolyte contains LiTFSI as a main component. That is, when the total amount of the electrolyte contained (dissolved) in the electrolyte solution is set as a reference (100 mol %), LiTFSI is preferably contained at 50 mol % or more, more preferably 70 mol % or more, and most preferably 90 mol % or more.

The aqueous electrolyte solution 50 preferably contains LiTFSI at 1 mol or more per kg of water, more preferably 5 mol or more, and most preferably 7.5 mol or more. An upper limit is not particularly limited, and is, for example, preferably 25 mol or less. In the aqueous electrolyte solution 50, when the concentration of LiTFSI increases, the reduction side potential window of the aqueous electrolyte solution 50 tends to expand.

In particular, the aqueous electrolyte solution 50 preferably contains 7.5 mol or more and 12.5 mol or less of LiTFSI per kg of water. According to findings by the inventors, when the concentration of LiTFSI is within such a range, an effect of improving a withstand voltage for reducing decomposition of the electrolyte solution and an effect of improving ionic conductivity of the electrolyte solution are exhibited in a more well-balanced manner.

The electrolyte solution may further contain an electrolyte other than LiTFSI. An electrolyte other than LiTFSI, $LiPF_6$, $LiBF_4$, $Li_2SO_4$, $LiNO_3$ or the like may be contained in addition to the imide-based electrolyte such as lithium bis(fluorosulfonyl)imide. When the total amount of the electrolyte contained (dissolved) in the electrolyte solution is set as a reference (100 mol %), the electrolyte other than LiTFSI is preferably contained at 50 mol % or less, more preferably 30 mol % or less, and most preferably 10 mol % or less.

3.4.3. Optional Components

The aqueous electrolyte solution 50 may contain other components in addition to the above solvent and electrolyte. For example, it is possible to add an alkali metal, an alkaline earth metal, and the like, other than lithium as a cation, as another component. In addition, lithium hydroxide and the like may be contained in order to adjust a pH of the aqueous electrolyte solution 50.

The pH of the aqueous electrolyte solution 50 is not particularly limited. In general, when the pH of the aqueous electrolyte solution decreases, an oxidation side potential window tends to expand. On the other hand, when the pH of the aqueous electrolyte solution increases, the reduction side potential window tends to expand. Here, according to new findings by the inventors, when the concentration of LiTFSI in the aqueous electrolyte solution 50 increases, the pH of the aqueous electrolyte solution 50 decreases. Nevertheless, according to new findings by the inventors, even if LiTFSI is contained at a high concentration in the aqueous electrolyte solution 50, the reduction side potential window can sufficiently expand. For example, even if the pH of the aqueous electrolyte solution 50 is reduced to 3, the reduction side potential window can be 1.83 V vs. Li/Li$^+$ which is a thermodynamically stable range of water or less. An upper limit of the pH is not particularly limited, but the pH is preferably 11 or less in order to maintain a high oxidation side potential window. In summary, the pH of the aqueous electrolyte solution 50 is preferably 3 or more and 11 or less. A lower limit of the pH is more preferably 6 or more and an upper limit is more preferably 8 or less.

3.4.4. Separator

In the battery 1000, the separator 51 is provided between the negative electrode active material layer 20 and the positive electrode active material layer 40. As the separator 51, a separator used in an aqueous electrolyte battery (such as NiMH and Zn-Air) of the related art is preferably used. For example, a separator having hydrophilicity such as nonwoven fabrics made of cellulose as a material can be preferably used. The thickness of the separator 51 is not particularly limited, and the separator 51 having a thickness of, for example, 5 µm or more and 1 mm or less, can be used.

3.5. Other Components of Battery

In the battery 1000, a terminal, a battery case, and the like are included in addition to the above components. Other components are obvious to those skilled in the art with reference to the present disclosure, and thus descriptions thereof are omitted here.

The above battery 1000 can be produced by applying a known method. For example, the battery 1000 can be produced as follows. However, a method of producing the battery 1000 is not limited to the following method. (1) A negative electrode active material and the like constituting the negative electrode active material layer 20 are dispersed in a solvent to obtain a negative electrode mixture paste (slurry). The solvent used in this case is not particularly limited, and water and various organic solvents can be used. The negative electrode mixture paste (slurry) is applied to a surface of the negative electrode current collector 10 using a doctor blade or the like and then dried to form the negative electrode active material layer 20 on a surface of the negative electrode current collector 10, thereby obtaining the negative electrode 100. (2) A positive electrode active material and the like constituting the positive electrode active material layer 40 are dispersed in a solvent to obtain a positive electrode mixture paste (slurry). The solvent used in this case is not particularly limited, and water and various organic solvents can be used. The positive electrode mixture paste (slurry) is applied to a surface of the positive electrode current collector 30 using a doctor blade or the like and then dried to form the positive electrode active material layer 40 on a surface of the positive electrode current collector 30, thereby obtaining a positive electrode 200. (3) A laminate including the negative electrode current collector 10, the negative electrode active material layer 20, the separator 51, the positive electrode active material layer 40, and the positive electrode current collector 30 in that order with the separator 51 interposed between the negative electrode and the positive electrode is obtained. Other members such as a terminal are attached to this laminate as necessary. (4) The laminate is accommodated in the battery case, the aqueous electrolyte solution 50 is filled into the battery case, the laminate is immersed in the aqueous electrolyte solution 50, and the laminate and the electrolyte solution are sealed in the battery case, thereby obtaining the battery 1000.

As described above, when the negative electrode current collector 10 is applied to the aqueous lithium ion secondary battery 1000, the reduction side potential window of the aqueous electrolyte solution 50 can expand and cycle stability of a secondary battery can be ensured.

1. Method of Evaluating Potential Window 1.1. Adjustment of Aqueous Electrolyte Solution Adjustment was performed so that LiTFSI was contained at a predetermined mol per kg of water and the solution was then left in a thermostatic chamber at 30° C. overnight. Then, the temperature was stabilized using the thermostatic chamber at 25° C. for 3 hours or more before evaluation.

1.2. Potential Window Evaluation

Preparation of Cell

Various metal foils (refer to the following Table 1) were used as working electrodes and an SUS plate (a spacer of a coin battery) on which Au was deposited was used as a counter electrode and assembling into an opposing cell with an opening diameter of φ 10 mm (a distance between electrode plates that was about 9 mm) was performed. Ag/AgCl (commercially available from Inter Chemical Ltd.) was used as a reference electrode and various electrolyte solutions (about 2 cc) were injected into the cells to prepare evaluation cells.

TABLE 1

| Type of material | Manufacturer |
| --- | --- |
| Mg | Furuuchi Chemical Corporation |
| Zr | Nilaco Corporation |
| In | Nilaco Corporation |
| Pb | Nilaco Corporation |
| Al | Nilaco Corporation |
| Zn | Nilaco Corporation |
| Ti | Rikazai |
| Sn | Nilaco Corporation |
| Mo | Nilaco Corporation |
| Fe | Nilaco Corporation |
| Cu | Nilaco Corporation |
| SUS316 | Nilaco Corporation |
| Au | Nilaco Corporation |
| Ni | Nilaco Corporation |
| Pt | Nilaco Corporation |

1.3. Evaluation Conditions

Devices and conditions used for evaluation were as follows.

(Devices): electrochemical measuring device: VMP3 (commercially available from BioLogic) and thermostatic chamber: LU-124 (commercially available from Espec) (Conditions): potential window: cyclic voltammetry (CV), 1 mV/s The reduction side started sweeping from OCP to the cathode side. Sweeping was reversed at or below a potential at which a reduction current of about 0.2 mA/cm$^2$ continuously flowed with −1.7 V vs. Ag/AgCl (about 1.5 V vs. Li/Li$^+$) as a guide. For a potential window on the reduction side, a Faraday current region of 0.2 mA/cm$^2$ or less was read. Regarding a change in the reduction side potential window according to the CV cycle, an inflection point before the Faraday current region was read from the first cycle and the fifth cycle, and a difference therebetween was calculated.

2. Charging and Discharging Evaluation 2.1. Adjusting Electrolyte Solution

An aqueous electrolyte solution was adjusted in the same manner as in 1.1.

2.2. Coating of Electrode

As the active material, $Li_4Ti_5O_{12}$ (LTO) was used for the working electrode (negative electrode) and $LiMn_2O_4$ (LMO) was used for the counter electrode. Acetylene black was used as the conductive assistant and PVdF was used as the binder. As the current collector, various metal foils shown in Table 1 were used for the negative electrode side and an SUS316L foil (commercially available from Nilaco Corporation) was used for the positive electrode side. First, the active material and the conductive assistant were mixed using a mortar, and PVdF was then added thereto. A mass ratio between the active material, the conductive assistant, and the PVdF was active material:conductive assistant: PVdF=85:10:5. NMP was added while checking the viscosity, mixing using the mortar continued and the mixture became uniform, and the mixture was then transferred to an ointment container and mixed using a mixer (THINKY mixer commercially available from THINKY) at 3000 rpm for 10 minutes. A slurry obtained in this manner was placed on a metal foil and applied using a doctor blade. Then, this was left in a dryer at 60° C. overnight and the solvent was dried, thereby obtaining electrodes. The obtained electrodes were punched at φ 16 mm and roll-pressed so that a porosity became 40%. LTO had a capacity of 0.3 mAh/cm², and LMO had a capacity of 0.6 mAh/cm².

2.3. LTO Evaluation
Preparation of Cell

An LTO electrode was used as a working electrode and an LMO electrode was used as a counter electrode, and assembling into an opposing cell with an opening diameter of φ 10 mm (a distance between electrode plates that was about 9 mm) was performed. Ag/AgCl (commercially available from Inter Chemical Ltd.) was used as a reference electrode and various electrolyte solutions (about 2 cc) were injected into the cells to prepare evaluation cells.

2.4. Evaluation Conditions

Devices and conditions used for evaluation were as follows.
(Devices): electrochemical measuring device: VMP3 (commercially available from BioLogic) and thermostatic chamber: LU-124 (commercially available from Espec) (Conditions): without hold: CV, 10 mV/s, sweeping from OCP toward a lower potential, and sweeping was reversed at −1.6 V vs. Ag/AgCl (about 1.6 V vs. Li/Li⁺). This was performed over 100 cycles.

3. Evaluation Results

In the following Table 2, a reduction potential window for concentrations of LiTFSI and the cycle stability of a potential window are shown. Here, a work function was cited from Chemical Handbook Basic Guide II (Chemical Society of Japan, 5$^{th}$ edition).

ciently expand (Comparative Examples 2 to 8). In addition, among Examples 1 to 7 and Comparative Example 1, an amount of change in the reduction potential from the first cycle to the fifth cycle exceeded 0.3 V, and the cycle stability was poor only in Comparative Example 1. When the cycle stability of the current collector in CV was poor, the cycle stability of the negative electrode and the secondary battery was assumed to be poor. As described above, the reduction side potential window sufficiently expanded and cycle stability was excellent only in Examples 1 to 7.

Figure 4A:
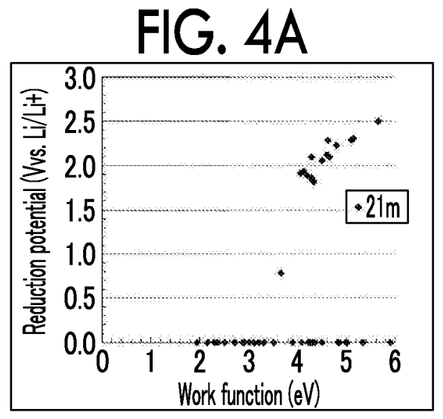
FIG. 4A is a diagram showing a relationship between a work function of a material constituting a negative electrode current collector and a reduction side potential window (CV fifth cycle) of an aqueous electrolyte solution.
Figure 4B:
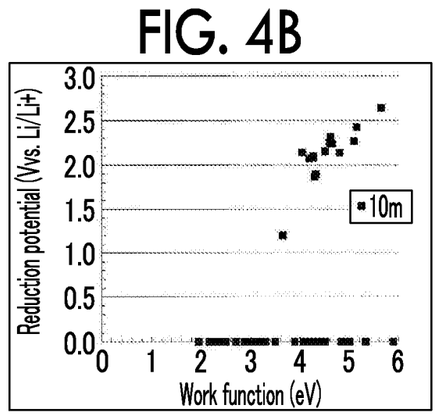
FIG. 4B is a diagram showing a relationship between a work function of a material constituting a negative electrode current collector and a reduction side potential window (CV fifth cycle) of an aqueous electrolyte solution.
Figure 4C:
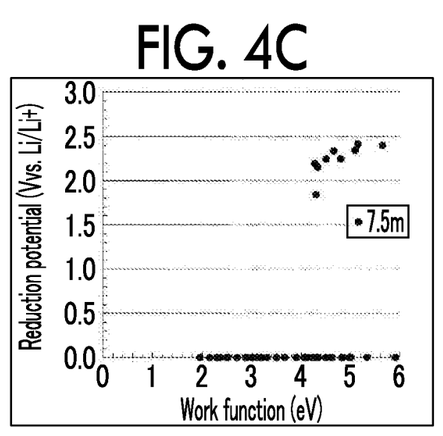
FIG. 4C is a diagram showing a relationship between a work function of a material constituting a negative electrode current collector and a reduction side potential window (CV fifth cycle) of an aqueous electrolyte solution.
Figure 4D:
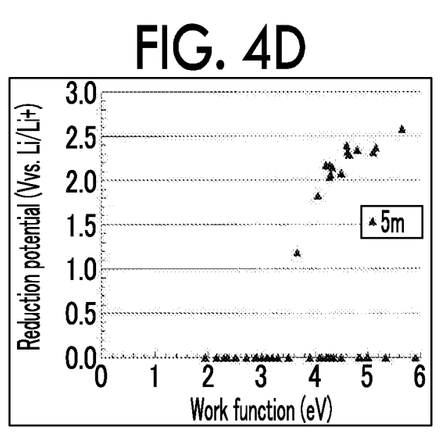
FIG. 4D is a diagram showing a relationship between a work function of a material constituting a negative electrode current collector and a reduction side potential window (CV fifth cycle) of an aqueous electrolyte solution.
Figure 4E:
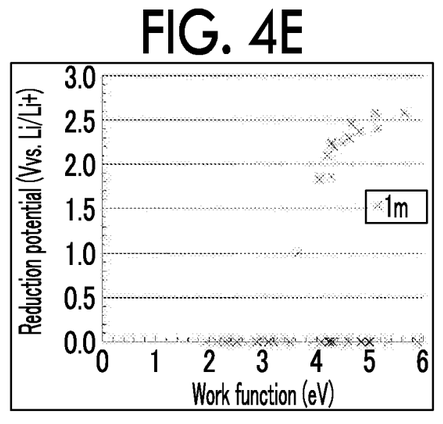
FIG. 4E is a diagram showing a relationship between a work function of a material constituting a negative electrode current collector and a reduction side potential window (CV fifth cycle) of an aqueous electrolyte solution.

FIG. 4A to FIG. 4E show relationships between a work function of a material constituting a negative electrode current collector and a reduction side potential window of the aqueous electrolyte solution (CV fifth cycle). FIG. 4A shows a case in which LiTFSI had a concentration of 21 m, FIG. 4B shows a case in which LiTFSI had a concentration of 10 m, FIG. 4C shows a case in which LiTFSI had a concentration of 7.5 m, FIG. 4D shows a case in which LiTFSI had a concentration of 5 m, and FIG. 4E shows a case in which LiTFSI had a concentration of 1 m. It can be understood from FIG. 4A to FIG. 4E, that when a work function of a material constituting a negative electrode current collector was smaller, the reduction side potential window nonlinearly and significantly expanded.

Figure 5A:
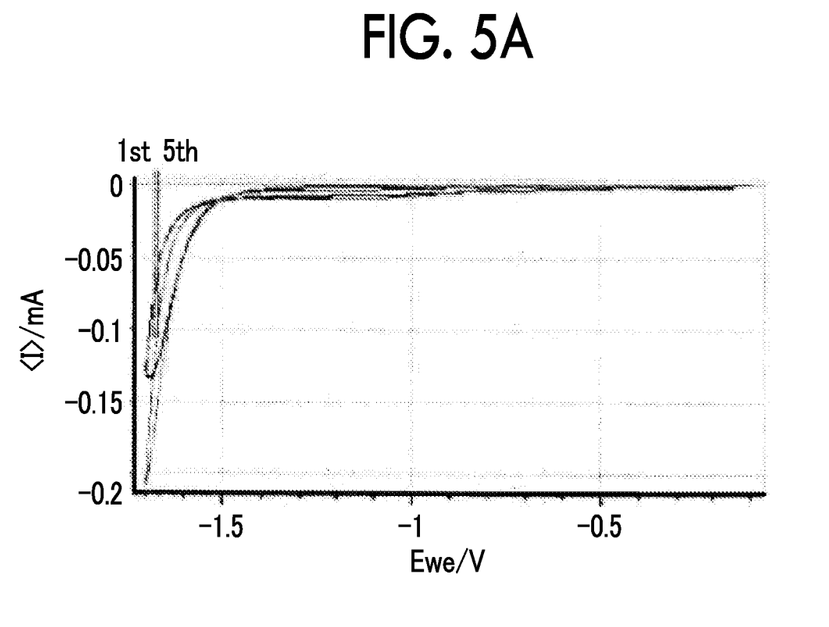
FIG. 5A is a diagram showing a cyclic voltammogram on the reduction side in collector foils.
Figure 5B:
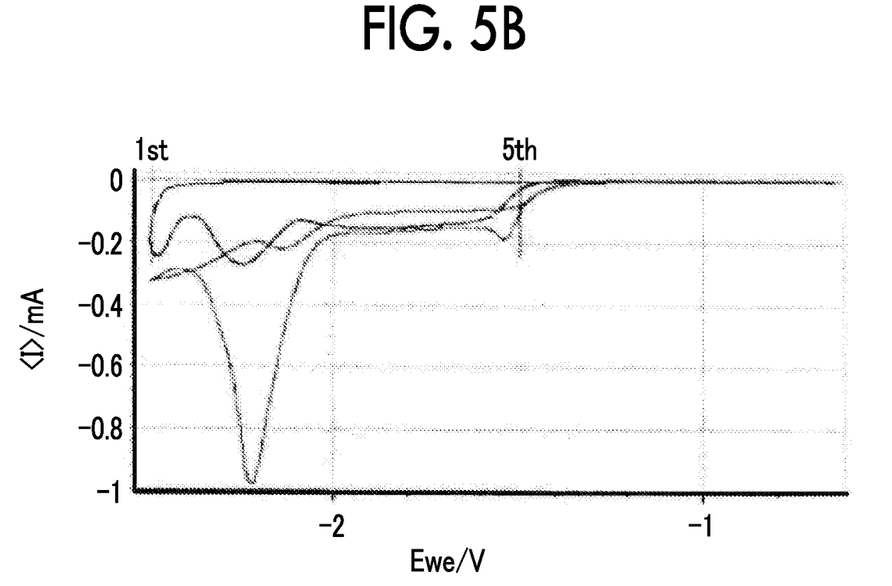
FIG. 5B is a diagram showing a cyclic voltammogram on the reduction side in collector foils.

FIG. 5A and FIG. 5B show cyclic voltammograms on the reduction side in collector foils when LiTFSI in the electrolyte solution has a concentration of 21 m. FIG. 5A shows a case in which a Ti foil was used and FIG. 5B shows a case

TABLE 2

| | Type of material | Work function eV | Reduction side potential window V vs. Li/Li+ LSV | | | | Cycle stability of potential window Amount of change in reduction potential from first cycle to fifth cycle ΔV | | | |
|---|---|---|---|---|---|---|---|---|---|---|
| | | | 1 m | 5 m | 10 m | 21 m | 1 m | 5 m | 10 m | 21 m |
| Example 1 | Mg | 3.66 | 1.02 | 0.85 | 0.79 | 0.58 | −0.14 | −0.01 | 0.04 | 0.07 |
| Example 2 | Zr | 4.05 | 1.50 | 1.52 | 1.53 | 1.47 | −0.08 | −0.02 | 0.25 | 0.27 |
| Example 3 | In | 4.12 | 1.85 | 1.85 | 1.83 | 1.76 | 0.29 | 0.18 | 0.23 | 0.24 |
| Example 4 | Pb | 4.2 | 1.61 | 1.58 | 1.44 | 1.27 | 0.29 | 0.18 | 0.23 | 0.24 |
| Comparative Example 1 | Al | 4.28 | 1.68 | 1.63 | 1.55 | 0.75 | 0.20 | 0.37 | 0.31 | 0.35 |
| Example 5 | Zn | 4.3 | 1.74 | 1.76 | 1.73 | 1.64 | 0.27 | 0.25 | −0.01 | 0.09 |
| Example 6 | Ti | 4.33 | 1.69 | 1.69 | 1.58 | 1.49 | 0.15 | 0.14 | −0.18 | −0.01 |
| Example 7 | Sn | 4.5 | 1.76 | 1.81 | 1.76 | 1.66 | 0.21 | 0.00 | 0.12 | 0.06 |
| Comparative Example 2 | Mo | 4.6 | — | 2.00 | 1.96 | 1.81 | — | 0.15 | −0.14 | −0.03 |
| Comparative Example 3 | Fe | 4.62 | 2.07 | 2.13 | 2.10 | 2.10 | 0.05 | 0.10 | 0.09 | 0.13 |
| Comparative Example 4 | Cu | 4.65 | 2.29 | 2.01 | 1.91 | 1.88 | 0.15 | 0.05 | −0.03 | −0.15 |
| Comparative Example 5 | SUS316 | 4.8 | 2.03 | 1.96 | 1.90 | 1.90 | 0.03 | 0.11 | −0.04 | 0.12 |
| Comparative Example 6 | Au | 5.1 | 2.10 | 2.11 | 2.07 | 1.88 | 0.16 | −0.09 | −0.06 | −0.06 |
| Comparative Example 7 | Ni | 5.15 | 2.18 | 2.22 | 2.16 | 2.08 | −0.04 | −0.08 | 0.00 | −0.06 |
| Comparative Example 8 | Pt | 5.65 | 2.36 | 2.33 | 2.30 | 2.34 | 0.06 | 0.08 | 0.15 | −0.01 |

As can be clearly understood from the results shown in Table 2, when a negative electrode current collector was made of a material with a work function of 4.5 eV or less, the reduction side potential window expanded to 1.83 V vs. Li/Li⁺ which was a thermodynamically stable range of water or less (Examples 1 to 7 and Comparative Example 1). On the other hand, when a negative electrode current collector was made of a material with a work function of more than 4.5 eV, the reduction side potential window did not suffiin which an Al foil was used. In FIG. 5A and FIG. 5B, when the Ti foil was used as the negative electrode current collector, cycle stability was excellent. On the other hand, when the Al foil was used, cycle stability was poor.

Figure 6:
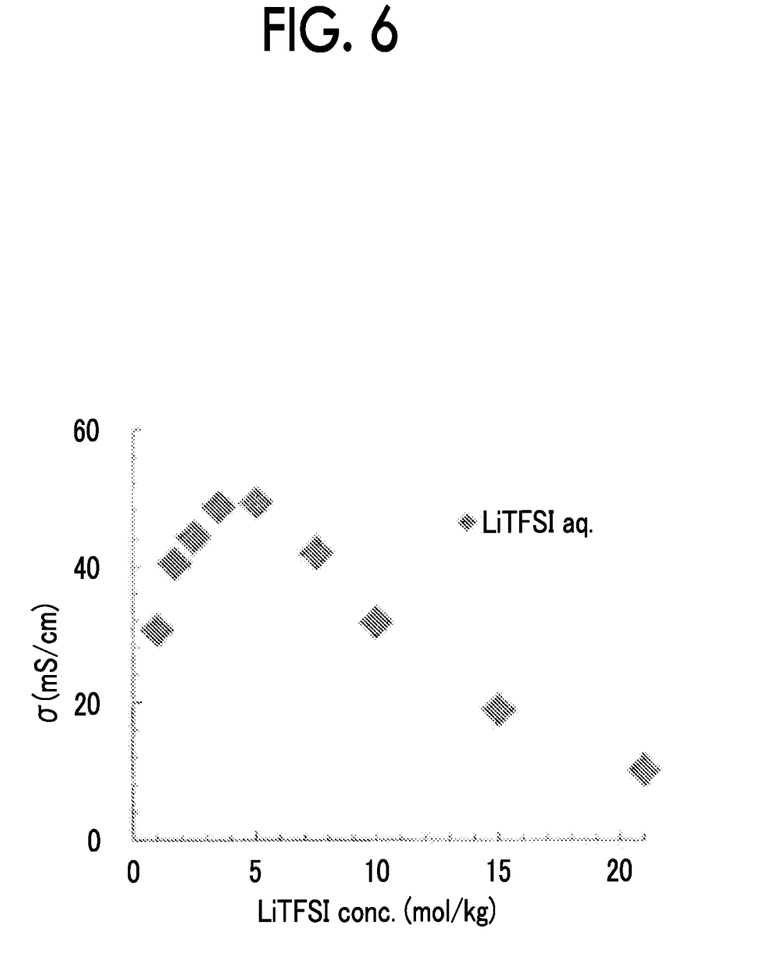
FIG. 6 is a diagram showing a relationship between a concentration of LiTFSI and ionic conductivity in an aqueous electrolyte solution.

FIG. 6 shows a relationship between a concentration of LiTFSI in the aqueous electrolyte solution and ionic conductivity of the aqueous electrolyte solution. It can be understood from FIG. 6, that when the concentration of LiTFSI was too high, the ionic conductivity decreased.

Figure 7:
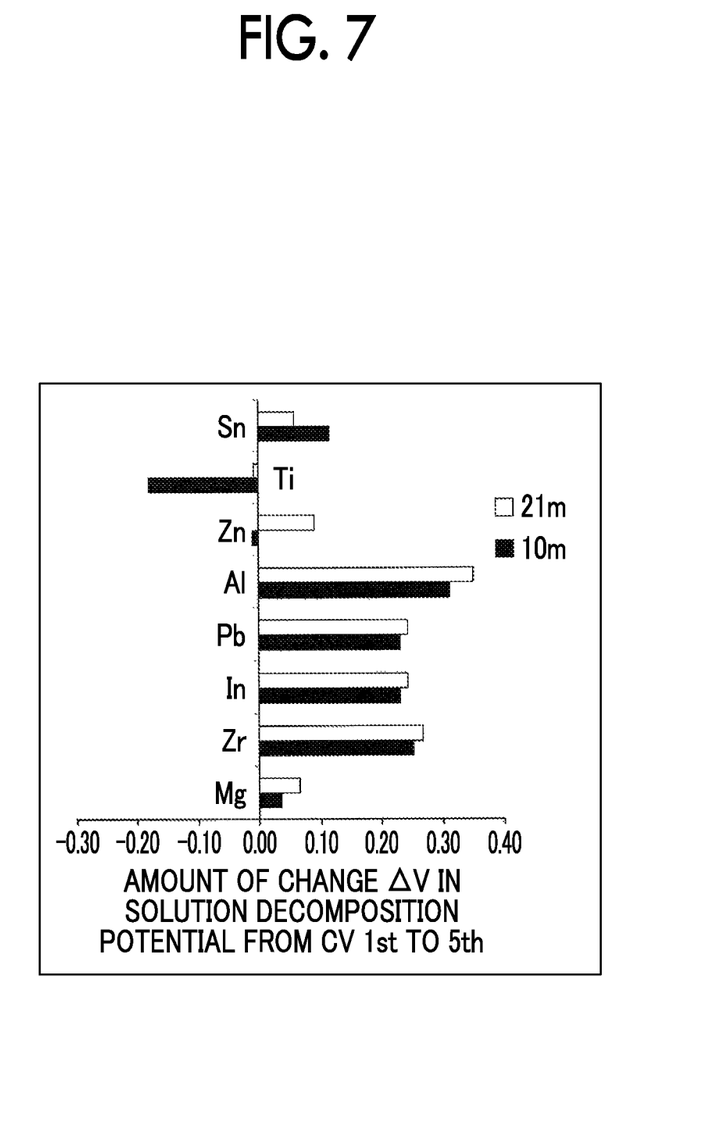
FIG. 7 is a diagram for explaining an amount of change in decomposition potential in an aqueous electrolyte solution from the first cycle to fifth cycle in a cyclic voltammogram when various negative electrode current collectors are used.

FIG. 7 shows an amount of change in decomposition potential of the aqueous electrolyte solution from the first cycle to the fifth cycle in the cyclic voltammogram when various negative electrode current collectors were used. In FIG. 7, when reduction side withstand potentials immediately before an inflection point before flowing of a Faraday current started were plotted, Sn, Zn, and Mg had a smaller positive value of ΔV than the others. This suggests that a withstand potential was unlikely to vary, but activity slightly decreased according to the CV cycle. In addition, ΔV had a negative value only with Ti. Generally, an oxide film was present on a metal surface. When a reduction current flowed, since such a substance was removed, there was a likelihood of the activity increasing. Alternatively, in particular, a Ti oxide film has relatively high conductivity, and the oxide film is unlikely to be reduced even if a reduction current flows, and thus it is thought that a change in potential is unlikely to be generated on the positive side. In addition, there is a possibility of an SEI derived from TFSI being formed as a factor of change in potential that was decreasing. That is, there is a greater likelihood of a favorable quality SEI being formed on the Ti surface compared to the others.

Figure 8A:
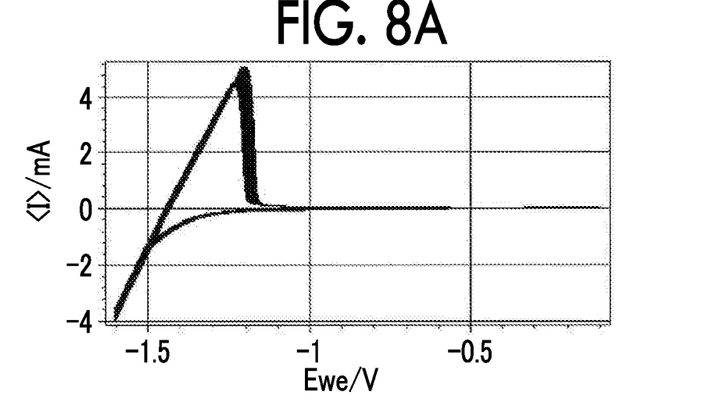
FIG. 8A is a diagram showing a cyclic voltammogram of a negative electrode obtained by applying LTO to various negative electrode current collectors.
Figure 8B:
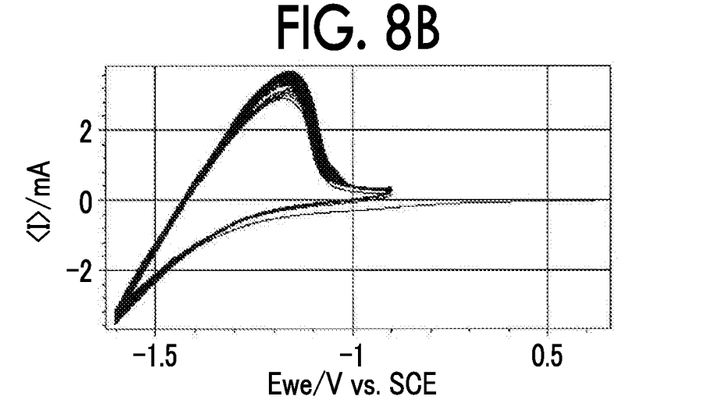
FIG. 8B is a diagram showing a cyclic voltammogram of a negative electrode obtained by applying LTO to various negative electrode current collectors.
Figure 8C:
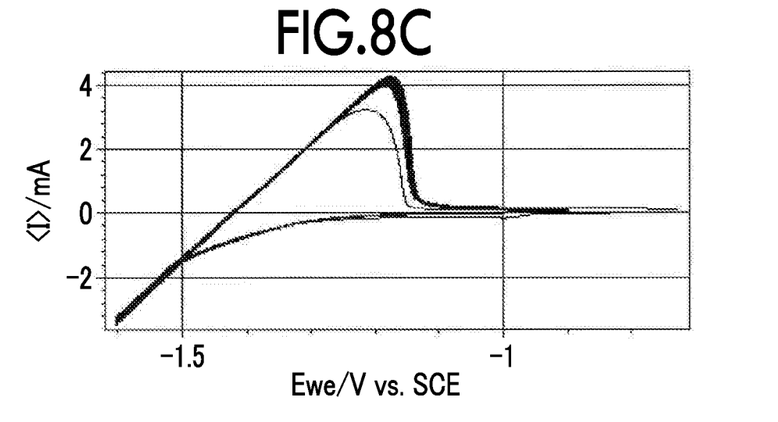
FIG. 8C is a diagram showing a cyclic voltammogram of a negative electrode obtained by applying LTO to various negative electrode current collectors.
Figure 8D:
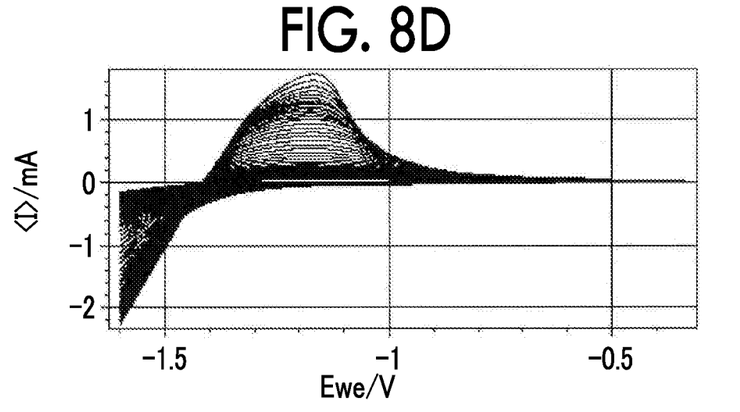
FIG. 8D is a diagram showing a cyclic voltammogram of a negative electrode obtained by applying LTO to various negative electrode current collectors.
Figure 8E:
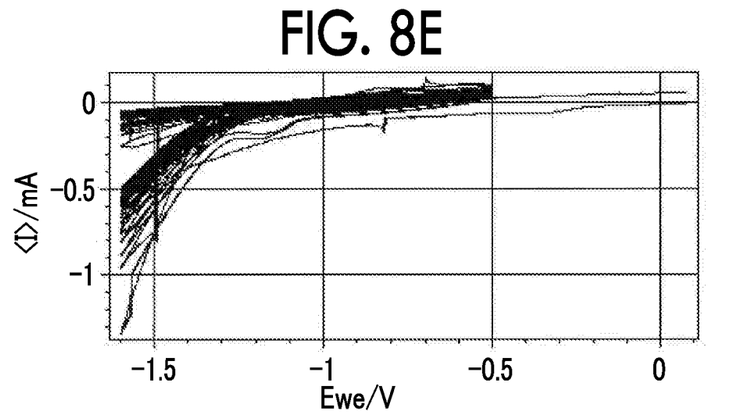
FIG. 8E is a diagram showing a cyclic voltammogram of a negative electrode obtained by applying LTO to various negative electrode current collectors.
Figure 9:
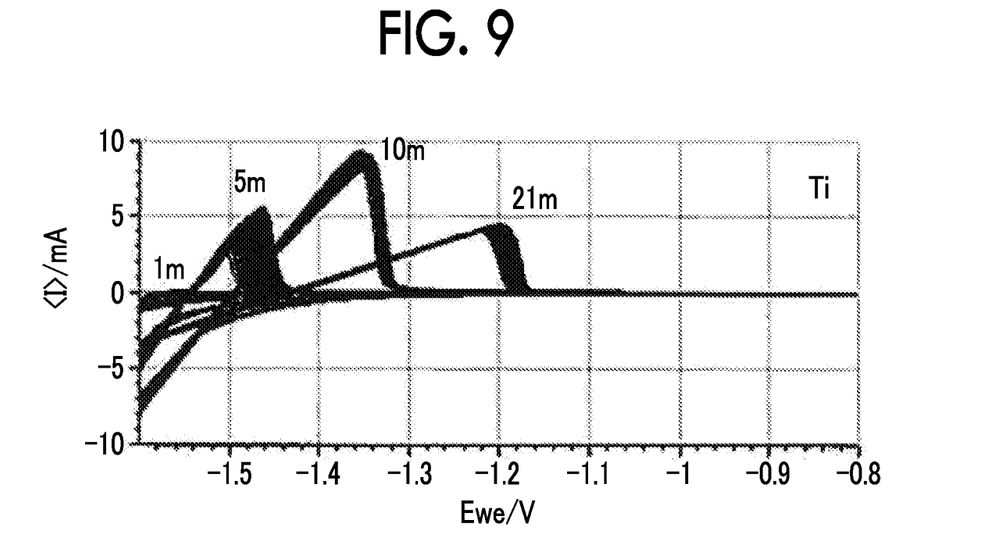
FIG. 9 is a diagram showing a cyclic voltammogram for concentrations of LiTFSI of a negative electrode obtained by applying LTO to a Ti negative electrode current collector.

FIG. 8A to FIG. 8E show cyclic voltammograms of the negative electrodes obtained by applying LTO to various negative electrode current collectors. FIG. 8A shows a case in which a Ti foil was used, FIG. 8B shows a case in which an Sn foil was used, FIG. 8C shows a case in which a Zn foil was used, FIG. 8D shows a case in which an Al foil was used, and FIG. 8E shows a case in which an SUS foil was used. FIG. 9 shows a cyclic voltammogram of the negative electrode obtained by applying LTO to a Ti negative electrode current collector for concentrations of LiTFSI. As shown in FIG. 8A to FIG. 8E, and FIG. 9, when the Ti foil, the Sn foil, and the Zn foil (all of them were the negative electrode current collectors according to the examples) were used, LTO was stably charged and discharged over 50 cycles or more in CV. Since the negative electrode current collector reduced decomposition of the aqueous electrolyte solution with respect to a potential of −1.6 V vs. Ag/AgCl (1.64 V vs. Li/Li$^+$), charging and discharging were thought to be possible. On the other hand, it is thought that, when the Al foil (the negative electrode current collector according to Comparative Example 1) was used, even if an effect of expanding a potential window was confirmed in the first cycle, the activity of the current collector changed in the second cycle and thereafter, decomposition of the aqueous electrolyte solution proceeded, and the capacity of LTO significantly deteriorated accordingly. In addition, it is thought that, since the reduction side potential window did not sufficiently expand in the SUS foil (the negative electrode current collector according to Comparative Example 5), LTO was not discharged at all, and the confirmed reduction current was completely consumed for decomposition of the aqueous electrolyte solution.

Figure 10:
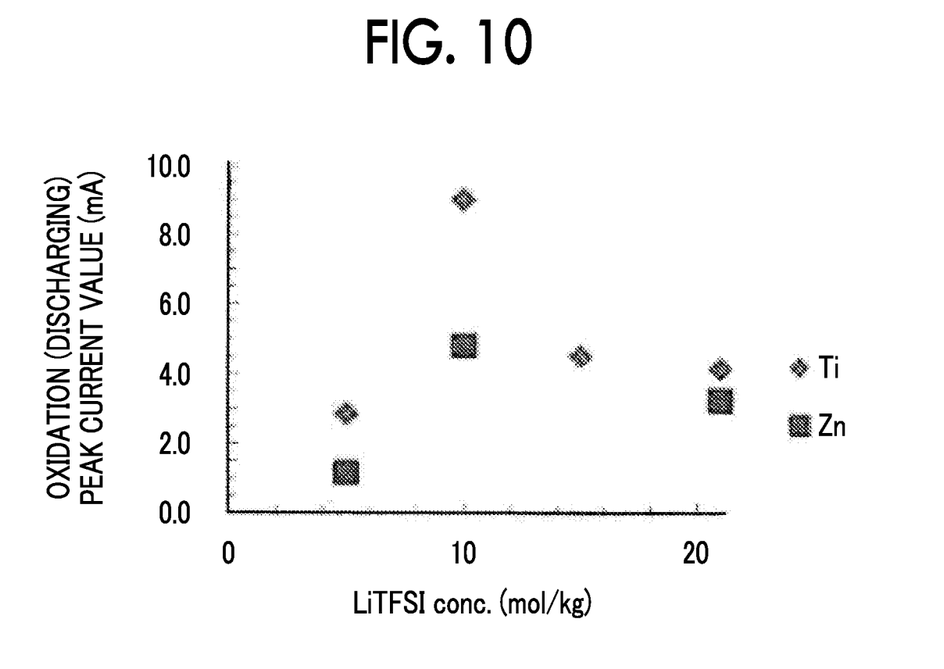
FIG. 10 is a diagram showing a relationship between a concentration of LiTFSI and an oxidation peak current value when a Ti negative electrode current collector and a Zn negative electrode current collector are used.

FIG. 10 shows a relationship between a concentration of LiTFSI and an oxidation peak current value when a Ti negative electrode current collector and a Zn negative electrode current collector were used. It can be understood from FIG. 10 that, when LiTFSI was contained at 7.5 mol or more and 12.5 mol or less per kg of water, improvement in ionic conductivity of the aqueous electrolyte solution and improvement in withstand voltage for reducing decomposition of the electrolyte solution necessary for a charging and discharging reaction of LTO were in an optimal balance.

Incidentally, while cases in which the entire surface and interior of the negative electrode current collector are made of a predetermined material have been exemplified in the above examples, it is apparent that, if a surface (in particular, a surface that is in contact with the aqueous electrolyte solution) of the negative electrode current collector is made of a predetermined material, the same effects can be exhibited.

The aqueous lithium ion secondary battery using the negative electrode current collector of the present disclosure has excellent cycle stability, and can be widely used in a large-sized power source mounted on a vehicle to a small-sized power source for a mobile terminal.

What is claimed is:

1. An aqueous lithium ion secondary battery, comprising:
    a negative electrode current collector comprising a surface in contact with an aqueous electrolyte solution, the surface including a material containing 50 mol % or more of Mg;
    a negative electrode active material layer that includes a negative electrode active material and is in contact with the negative electrode current collector;
    a positive electrode current collector;
    a positive electrode active material layer that includes a positive electrode active material and is in contact with the positive electrode current collector; and
    an aqueous electrolyte solution containing water and an electrolyte,
    wherein the negative electrode current collector is in contact with the aqueous electrolyte solution,
    wherein the electrolyte contains lithium bis(trifluoromethanesulfonyl)imide, and the aqueous electrolyte solution contains the lithium bis(trifluoromethanesulfonyl)imide such that an amount of substance of the lithium bis(trifluoromethanesulfonyl)imide is within a range of 7.5 mol to 12.5 mol per kg of the water.

2. The aqueous lithium ion secondary battery according to claim 1, wherein the negative electrode active material contains lithium titanate.

3. The aqueous lithium ion secondary battery according to claim 1, wherein a pH of the aqueous electrolyte solution is within a range of 3 to 11.

4. The aqueous lithium ion secondary battery according to claim 1, wherein the positive electrode active material contains Li.

5. The aqueous lithium ion secondary battery according to claim 4, wherein the positive electrode active material contains Mn.

6. The aqueous lithium ion secondary battery according to claim 1, wherein, the surface includes the material containing Ti as a main component.

7. The aqueous lithium ion secondary battery according to claim 1, wherein the negative electrode current collector further contains a substrate, and the surface is applied to a surface of the substrate.

8. The aqueous lithium ion secondary battery according to claim 7, wherein the surface and the substrate are made of different materials.

* * * * *